Feb. 7, 1956        J. J. DANGELO        2,733,507
STITCH CUTTING TOOL
Filed Dec. 21, 1954
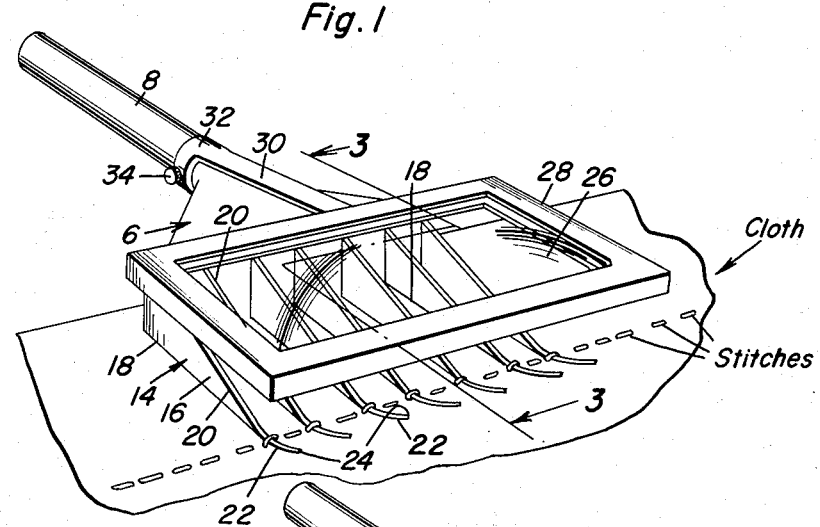
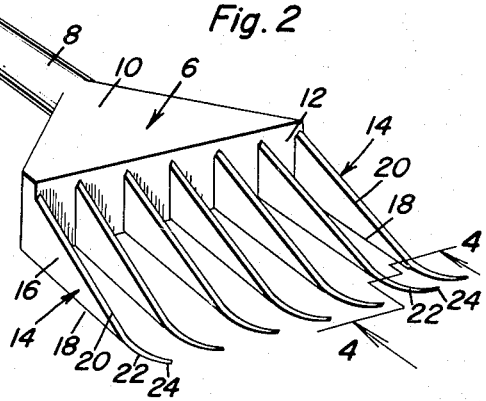
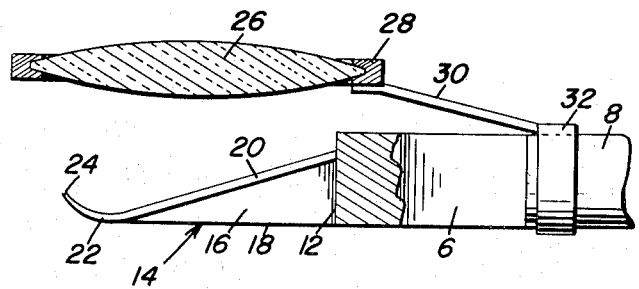
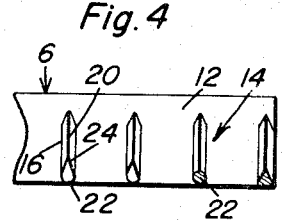
Joseph J. Dangelo
INVENTOR.

United States Patent Office 2,733,507
Patented Feb. 7, 1956

2,733,507

STITCH CUTTING TOOL

Joseph J. Dangelo, South Bend, Ind.

Application December 21, 1954, Serial No. 476,673

1 Claim. (Cl. 30—287)

The present invention relates to an improved hand tool which is expressly designed and suitably adapted to readily cut a plurality of stitches at one and the same time, and to, in this manner, expedite opening up a seam or removing a stitched-on patch or the like from a garment or similar apparel.

Persons familiar with special tools and implements in the field of endeavor under advisement are aware, obviously, that others working in this art have evolved and produced special scissors and so-called ripping tools, blades and the like to expedite ripping up of old clothing for salvage and other purposes. So-called combined thread cutting and stitch removing tools have also been devised for use. The object of the instant invention is to structurally, functionally and otherwise improve upon thread cutting and stitch removing tools such as are presently known and, in doing so, to provide a unique and therefore individual tool in which manufacturers, retailers, tailors, housewives and others will find their respective requirements and needs aptly taken into account and effectively met.

In carrying out a preferred embodiment of the inventive idea, a tool is provided which is characterized by a handle-equipped head, said head being provided with a plurality of spaced parallel cutting blades resembling what may be likened to a comb, the blades being preferably triangular in side elevation and having inclined cutting edges which assist in lifting and cutting the stitches or threads.

Further novelty is predicated on the construction briefly comprehended above and wherein the tapered or apical leading ends of the blades are provided with tines, said tines being preferably of tapering form with their leading ends slightly blunt to assist in piloting the blades into cutting relation in respect to the threads which are to be severed.

Other objects, features and advantages will become more readily apparent from the following description and the accompanying sheet of illustrative drawings.

In the drawings, wherein like numerals are employed to designate like parts throughout the views:

Figure 1 is a perspective view showing the thread cutting tool as constructed in accordance with the invention and also illustrating the magnifying glass which is preferably a part of and used in connection therewith;

Figure 2 is a perspective view based on the showing in Figure 1, but with the magnifying glass removed;

Figure 3 is a section on the irregular line 3—3 of Figure 1, looking in the direction of the arrows; and Figure 4 is an exaggerated fragmentary detail section on the line 4—4 of Figure 2, looking in the direction of the arrows.

Referring now to the drawings with the aid of reference numerals and accompanying lead lines designating the parts, reference is had first to Figure 2 wherein the numeral 6 designates a triangularly-shaped body which is here conveniently referred to as a head. On one side, this is provided with an integral suitably shaped handle 8 which is preferably cylindrical and which merges into the apical portion, as at 10. That side of the head which is treated in the claims as the "opposite" side is substantially rectangular and flat, and is denoted at 12. It is from this side that the battery or plurality of cutting and loosening blades extend. These blades are in spaced parallel relationship and in conjunction with the head resemble a sort of a comb. Each blade is the same in construction, and they are individually denoted by the numerals 14. As before stated, they are integral with the head and each blade is triangulated in side elevation, as at 16, and has what may be called a straight bottom edge 18 and an inclined cutting edge 20. This cutting edge, as brought out to the extreme right in Figure 4, is V-shaped in cross-section, the vertex side upwardly. The leading tapered or apical end of each blade has an integral tapering tine 22 which forms a piloting finger. This finger is curved in what may be called an upward direction, and the free or pointed end is preferably blunt, that is, the end denoted at 24. The idea is that the tine should not stick too easily into the texture of the fabric itself, but should be easily located and then passed between the stitch or thread and the cloth in an obvious manner, without too much hinderance. The principal idea, however, is in having these triangular, spaced, parallel blades with piloting fingers which position the series of blades in cutting relationship to the threads and thus, a plurality of threads are cut, all at the same time.

To facilitate performing the task, a magnifying glass is provided, and this is denoted generally by the numeral 26. It is of an area to occupy a position over the battery of blades. The glass is mounted in a rectangular frame 28 which, in turn, is provided centrally on one side with a reach arm 30 having a collar 32 which embraces the handle and abuts the head and is held in position by a setscrew 34.

It will be seen from the disclosure that I have evolved and produced a simple, practical and expedient tool which enables a user to handily perform ripping requirements by removing a seam, this in a manner which permits simultaneous cutting of a plurality of stitches. The user may take the stitch cutter, line it up with the threads or loops and force or drive the tines into the loops, wedging them partly to open positions, and then following through with the cutting blades in an obvious manner. It is clear that the tool will save time and money and materials, and will be of great help to tailors and others who work on and in connection with apparel in one form or another. As a matter of fact, a tool like this may be used by members of the armed forces in taking off patches and stripes when new ratings are handed out and experience has shown that it does the desired job with little or no trouble.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

For use in simultaneously cutting a plurality of stitches and thus opening a seam, removing a patch or the like; a hand tool comprising a head provided on one side with a handle and provided on the other side with a plurality of duplicate spaced parallel cutter blades which are substantially triangular in side elevation, each blade having a linearly straight bottom edge and a sharpened upper edge, the latter being inclined forwardly and downwardly to said bottom edge, all of said bottom edges being in a common plane and all of said sharpened upper edges being in the same common plane, and a tine fixed on the leading apical end of each blade and serving as a piloting finger for the complemental blade, said tine being longitudinally bowed and having an upturned blunt-ended free end portion.

References Cited in the file of this patent

UNITED STATES PATENTS

| | | |
|---|---|---|
| 2,013,902 | Tarrant | Sept. 10, 1935 |
| 2,455,972 | Bowditch | Dec. 14, 1948 |
| 2,556,366 | Miller | June 12, 1951 |